3,321,315
CAROTENE DERIVATIVE AND USE THEREOF
Henry Yokoyama, Pasadena, Calif., assignor to the United States of America as represented by the Secretary of Agriculture
No Drawing. Filed Aug. 5, 1965, Ser. No. 477,622
3 Claims. (Cl. 99—148)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of new carotene derivatives and methods for preparing and utilizing them. Further objects will be evident from the following description wherein parts and percentages are by weight unless otherwise specified.

In accordance with the invention, $\beta$-apo-8'-carotenal is condensed with a ketone of the structure—

$$CH_3—CO—R$$

(wherein R is an alkyl group).

to form a derivative wherein the terminal aldehyde (—CHO) group of the starting compound is replaced by the group—

$$—CH=CH—CO—R$$

(R being an alkyl group).

The condensation simply requires contacting the carotenal with the ketone reactant in the presence of a base, such as NaOH or KOH. Ordinarily, the reactants are dissolved in an inert solvent such as ethanol or isopropyl alcohol to achieve good contact of the one with the other. The synthesis of the invention may be demonstrated by the following equations:

(I)

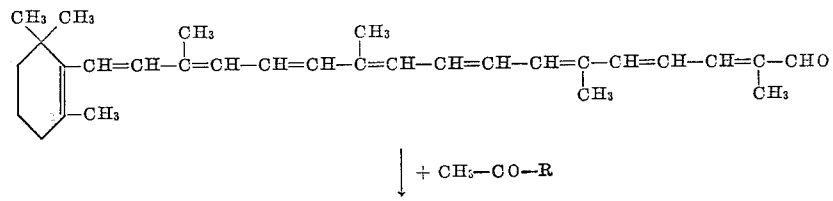

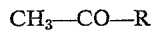

(II)

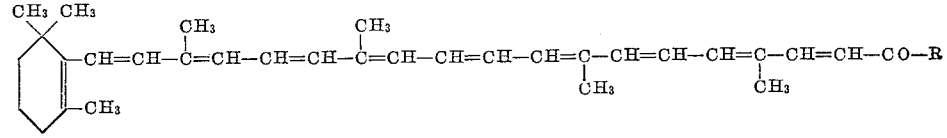

(wherein R is an alkyl group, such as methyl, ethyl, propyl, butyl, etc.).

The products of the invention are new compounds not heretofore known or described, and, because of their strong tinctorial properties, are particularly useful as coloring agents, e.g., for food products of all kinds. The compounds have the special advantage that they exhibit a redder color than the starting compound and are stable in the presence of light, fruit acids, ascorbic acid, and other agents which often are detrimental to pigments.

In the preferred embodiment of the synthesis, $\beta$-apo-8'-carotenal is reacted with acetone (R is methyl in the formulas above). The product, following usual chemical terminology, may be referred to as 5,9,14,18-tetramethyl-20-(2,6,6-trimethyl cyclohex-1-enyl)eicosa-3,5,7,9,11,13,15,17,19-nonaene-2-one. To avoid this cumbersome designation, the compound has been named citranaxanthin. I have further ascertained that citranaxanthin occurs as a minor component in the peel of the fruit *Sinton citrangequat* (a trigeneric hybrid of *Citrus sinensis* x *Poncirus trifoliata* x *Fortunella margarita*) and may be isolated therefrom by procedures of extraction and chromatography. However, it is to be emphasized that prior to this invention citranaxanthin was not known to exist in nature, or elsewhere for that matter.

The compounds of the invention are useful for coloring all kinds of foods. Typical illustrative examples of edible materials which may be colored with the compounds of the invention are fruits; vegetables; juices or other liquid preparations made from fruits or vegetables; meat products; egg products such as nogs, custards, angle food mixes; salad dressings; pickles and relishes; ice creams, sherbets, and ices; ice milk products; bakery products; icings; confections and confection toppings, syrups, and flavors; cake and pastry mixes; beverages such as carbonated soft drinks, fruit ades; wines; dietary-type foods; breakfast cereals; etc. Of course, the compounds can also be used for coloring other materials, e.g., medicinal preparations intended for oral administration; dental preparations such as pastes, powders, foams, and denture-retaining adhesives; mouth washes and similar oral antiseptic liquids; tobacco products; adhesives for gumming stamps, envelopes and labels, etc. In using the compounds of the invention, they are incorporated in the material to be colored in the amount required to attain the desired hue. Ordinarily, because of their intense tinctorial value, the compounds are employed in a very minor proportion, that is, in a concentration of 0.5% or less, usually less than 0.1%. It is obvious, however, that there is nothing critical about the concentration which is used; it is simply a matter of attaining a desired coloration appropriate to the material in question. For example, smaller concentrations of the compounds will provide yellow-orange and orange shades; larger concentrations will give red shades. Moreover, the technique of coloring materials with the compounds of the invention offers no difficulty as the selected compound is simply incorporated with the material to be colored. The compounds may be added directly to the material or they may be first incorporated with a diluent to increase their bulk so that small amounts of the compounds may be metered into the material. As diluents one may use liquid or solid carriers such as water, glycerol, edible oils, starch, sorbitol, salt, sugar, citric acid or other non-toxic substance compatible with the material to be colored. In a preferred modification, the compound is adsorbed on powdered gelatin. Such a composition is particularly useful in coloring aqueous materials such as citrus beverages, tomato juice, etc.

A particular advantage of the invention is that it enables the synthesis of citranaxanthin in pure crystalline form. In this state, citranaxanthin has high and uniform tinctorial power and is free from extraneous substances so that it can be advantageously used, even in very minor proportion, for the effective coloring of edible materials. In the state in which citranaxanthin occurs in nature, it is too dilute to be effective for coloring applications. Moreover, use of the natural material (e.g., peel of the abovementioned hybrid fruit) would also give rise to problems of introducing extraneous and even deleterious materials into the food to be colored and also problems of variable and uncertain citranaxanthin content.

The invention is further demonstrated by the following illustrative examples:

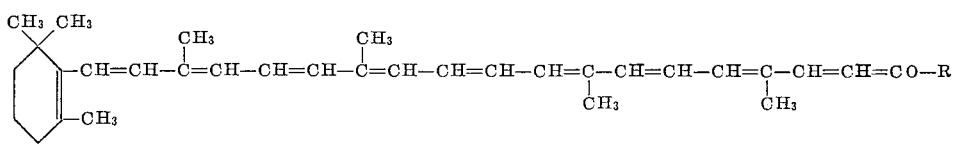

*Example I*

A solution of 0.5 g. of β-apo-8′-carotenal (Formula I, above) in 5 ml. of acetone and 5 ml. of ethanol was added drop by drop in an atmosphere of nitrogen to a well-stirred mixture of 0.5 ml. of N potassium hydroxide and 5 ml. of ethanol, and the reaction mixture was stirred at room temperature for 5 hours. The reaction mixture was then extracted with petroleum ether and the resulting extract was fed to a chromatographic column of magnesium oxide and diatomaceous earth. The column was eluted with a mixture of petroleum ether (95%) and acetone (5%). The solvent was evaporated from this eluate and the product, citranaxathin, was crystallized from petroleum ether, giving a yield of 0.4 g., M.P. 155–156° C. Infra-red absorption: $\lambda_{max}$ in petroleum ether at 463 and 495 m$\mu$; in benzene $\lambda_{max}$ at 482, shoulder at 507 m$\mu$. The n.m.r. spectrum gave singlets at $\tau$ 7.72, 8.02, 8.25, and 8.92, doublet at $\tau$ 2.50 (J=16 cps.).

*Analysis.*—Calculated for $C_{33}H_{44}O$: C, 86.76%; H, 9.74%. Found: C. 86.6%; H, 9.7%.

*Example II*

(A) To a sample of orange juice was added 0.05% of citranaxanthin and 0.1% sodium benzoate (to prevent microbial spoilage). The juice was held in a refrigerator at approximately 40° F. for one month. At the end of the time the juice was examined and tested. It was found that no change in color had occurred during the storage period, applying both visual and spectrophotometric examination.

(B) A 0.1% solution of citranaxanthin in $CCl_4$ was held in a bottle on a window sill (northern exposure). After two months of such storage there was no visible change in color. Spectrophotometric analysis indicated a slight degradation—appearance of a hump on the shorter wavelength side of the 463 m$\mu$ peak.

Having thus described the invention, what is claimed is:

1. A method for coloring an edible material, which comprises adding thereto a compound of the formula:

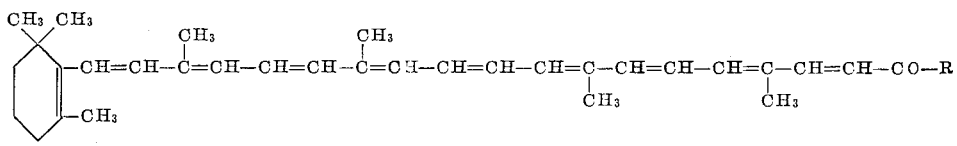

wherein R represents a methyl radical.

2. A composition comprising an edible material and a compound of the formula:

wherein R represents a methyl radical.

3. A composition comprising (1) a major proportion of a food and (2) a minor proportion of added pure crystalline 5,9,14,18-tetramethyl-20-(2,6,6-trimethyl cyclohex-1-enyl)-eicosa-3,5,7,9,11,13,15,17,19-nonaene-2-one.

References Cited by the Examiner

UNITED STATES PATENTS 2,861,891   11/1958   Bauernfiend et al. _____ 99—148
3,110,598   11/1963   Muller _____ 99—148

OTHER REFERENCES

Chem. Abs., volume 40, pages 5,639 to 5,642.

Karrer et al.: Carotenoids, Elsevier Publishing Co., Inc., New York, 1950, pages 250–251.

A. LOUIS MONACELL, *Primary Examiner.*

H. H. KLARE, *Assistant Examiner.*